April 26, 1960  C. B. BUDD ET AL  2,934,458
METHOD FOR COATING FILAMENTS OF GLASS
Filed May 21, 1953
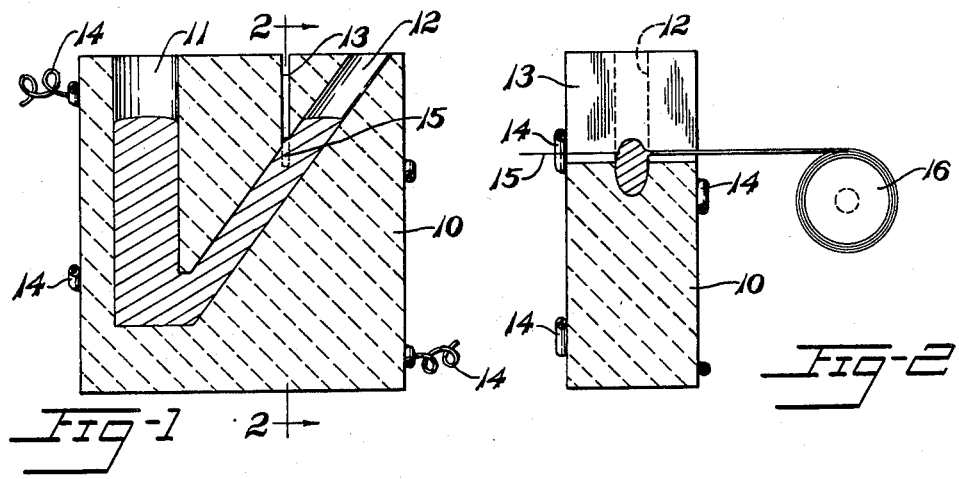
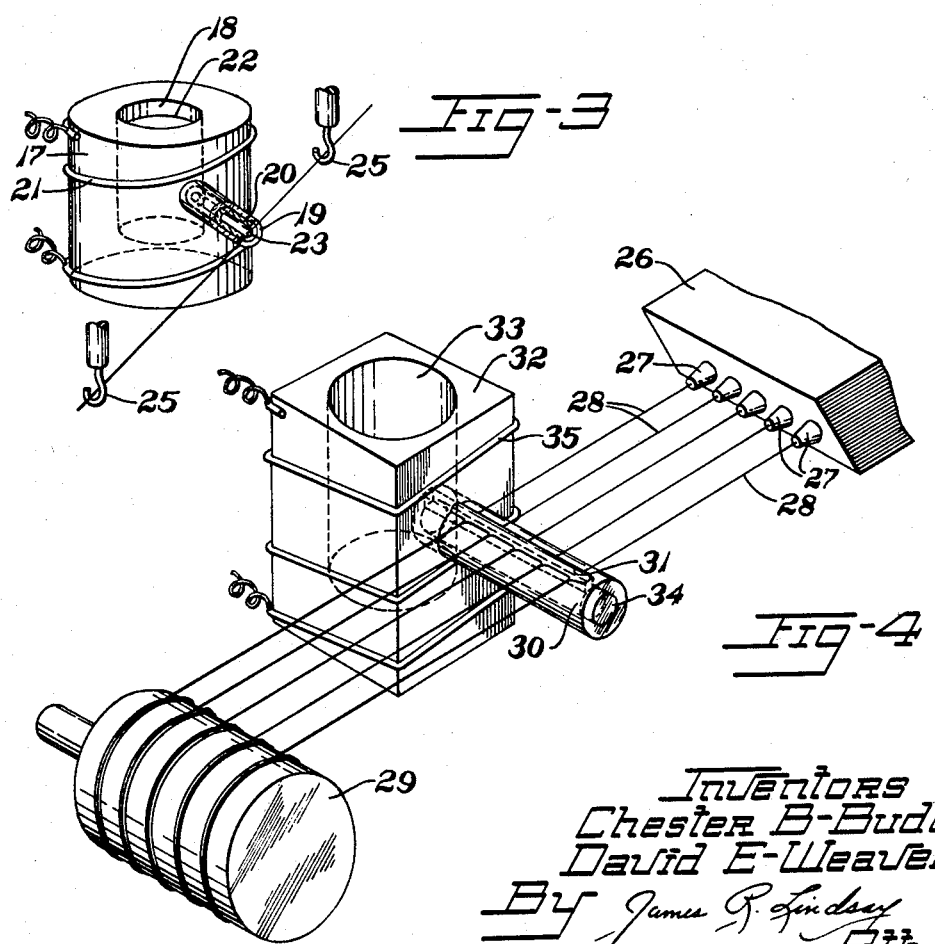
Inventors
Chester B. Budd
David E. Weaver
By James R. Lindsay
Atty.

United States Patent Office 2,934,458
Patented Apr. 26, 1960

2,934,458

METHOD FOR COATING FILAMENTS OF GLASS

Chester B. Budd, Brecksville, and David E. Weaver, Cuyahoga Falls, Ohio, assignors to The B. F. Goodrich Company, New York, N.Y., a corporation of New York Application May 21, 1953, Serial No. 356,456

4 Claims. (Cl. 117—126)

This invention relates to the preparation of filaments of glass and in particular to the coating of glass filaments with metal.

It has been observed that textile materials formed of glass filaments normally are unable to withstand severe working or flexing, thereby limiting the applications for which such materials can be satisfactorily used. This weakness in glass filament textile material seems to be associated with the high coefficient of friction between adjacent filaments of the structure at their points of glass-on-glass contact. It has recently been discovered that this weakness in glass filament textile material can be eliminated by coating the glass filaments with metal.

The problem of applying a coating of metal to a glass filament is a perplexing one, since glass filaments commonly employed in textile materials are extremely fine and are produced normally by a drawing operation at tremendous speeds. The objectives of this invention include providing apparatus and a convenient and economical process for continuously applying a coating of metal to a glass filament as the filament is formed. These objectives are accomplished by supplying molten metal to an orifice of capillary dimensions so that a minute and approximately constant ridge or bead of molten metal is exposed, and passing the glass filament through the ridge or bead of molten metal. A coating of metal is adhered tenaciously over the filament as it is withdrawn from the molten metal.

Illustrative embodiments of apparatus suitable for the practice of this invention are shown in the accompanying drawings in which:

Fig. 1 represents an enlarged section through a device for coating a single filament;

Fig. 2 represents a section transverse to that of Fig. 1 on line 2—2 thereof;

Fig. 3 represents an enlarged perspective view partly broken away and in section of a second device for coating a single filament; and Fig. 4 represents a perspective view of a device for coating a group of filaments simultaneously.

Referring to the device shown in Fig. 1, a graphite block 10 for confining molten coating metal is provided with a vertical chamber 11 and an inclined bore 12 intersecting the vertical chamber to form a V-shaped channel. A slit opening or passage 13 of capillary dimensions, for example a slit of about 0.01 inch in width, is cut into the upper face of the block until it intersects the inclined bore 12.

Although it is now preferred that the block 10 and the similar containers for molten metal in the other forms of apparatus of this invention be made of graphite, which material not only is able to withstand the relatively high temperatures to which the block will be subjected but, also, is practically completely resistant to chemical attack, it will be understood that other materials may be used which are capable of withstanding the temperature of the molten coating metal contained therein, such as high melting point metals or metal alloys which are not attacked by the coating metal, as well as certain ceramic materials, for example porcelain.

Heat is supplied to the graphite block in any convenient way, such as by an electric heater 14, as shown schematically in Figs. 1 and 2, or by direct flame heating, to heat the block to a temperature above the melting point of the coating metal contained therein so that the coating metal will be maintained in a molten state at all times during the coating operation.

The coating metal is charged into the vertical chamber 11, preferably in the form of small pieces of the metal, until the level of molten metal in the inclined bore 12 is above the bottom of the slit opening 13. A glass filament 15 which is formed in one of the well-known ways is coated with metal by threading it through the slit opening 13 and advancing it rapidly through the molten metal, such as by drawing the filament by winding it up on a revolving bobbin or spool 16, as shown in Fig. 2.

As a specific example of the practice of the coating operation, a graphite coating device such as shown in Figs. 1 and 2 is charged with zinc metal and is heated to a temperature of about 500° C., metal being charged to the graphite block until the meniscus of the molten metal is slightly above the bottom of the slit opening 13. A glass filament having a diameter of about 0.0003 inch is drawn through the slit opening at a rate of about 5000 feet a minute and wound on a spool. The filament is found to have increased in diameter by about 10 to 20 percent and to possess a firmly adherent coating of metallic zinc thereon. During the coating operation it is observed that the motion of the glass filament tends to draw some of the molten metal along the capillary slit opening 13 to the edge of the slit opening at the point where the filament 15 is withdrawn therefrom, but the surface tension of the molten metal prevents it from escaping as long as the level of the molten metal is properly maintained. It is necessary from time to time during the coating operation to charge additional metal to the block to replenish that used in coating so that the level of the molten metal in the inclined bore 12 is maintained substantially constant.

The conditions of application are not at all critical. Satisfactory results are obtained at speeds of passage of the glass filament through the molten metal varying over a wide range, and also at temperatures of the molten metal varying from just above the melting temperature of the metal or metal alloy to a temperature approaching that at which the glass of the filament softens or melts. With suitable precautions to assure contact of the glass with the metal for a very brief period, the temperature of the metal may even exceed the melting temperature of the glass without leading to breakage of the filament. Since the glass filament is quite fine, the dimensions of the apparatus can be quite small.

The device may be modified to coat several filaments simultaneously by providing a series of generally parallel slits similar to slit 13 in the graphite block 10.

In the embodiment of this invention shown in Fig. 3, the coating device comprises a receptacle 17 having a chamber 18 for receiving the molten coating metal and a hollow projecting arm 19 connected therewith, both made of graphite. They may be machined from a unitary block of material or fabricated separately, and if they are formed separately, the arm 19 can be attached to the receptacle by pressing or cementing it into an opening extending through the wall of the receptacle. The hollow arm 19 is lined with a cylindrical glass sleeve 20 which defines a passage of capillary dimensions, for example a passage having a diameter of about 0.02 inch, that extends into chamber 18 of the receptacle.

The receptacle is heated in a convenient manner, such as by an electric heater 21, to a temperature above the melting point of the coating metal or metal alloy. The coating metal is charged into chamber 18 of the receptacle, normally in the form of small pieces of the metal although molten metal can be poured directly into the chamber, until the metal when molten reaches a liquid level 22 above the height of the passage in arm 19, at which level a small bead 23 of molten metal forms at the external opening of the passage, the surface tension of the metal preventing the metal from flowing freely from the passage. The glass filament 24 which is to be coated is passed through the bead 23 of molten metal, and acquires a metal coating. If desired, graphite guides 25, 25 may be employed to assure proper disposition of the filament for passage through the bead of metal, it being preferred that the filament does not touch arm 19 as it passes through the metal bead.

Fig. 4 illustrates a coating device which can be used for applying a metal coating to one glass filament or to a number of glass filaments simultaneously. As shown in this figure of the drawings, a platinum bushing 26 having a row of nozzles 27, 27 projecting from a closed-end of the bushing is employed in the fabrication of the glass filaments 28, 28. Each nozzle 27 contains a small-diameter opening in its end face to permit a small stream of molten glass to flow therethrough, an opening having a diameter of about 0.02 inch commonly being used. The number of nozzles 27, 27 used on bushing 26 is dependent upon the number of glass filaments desired to be drawn at on time, bushings having over two hundred nozzles commonly being used, although a small number only are shown in Fig. 4 for clarity of illustration.

The bushing is charged with glass, which may be in the form of small spheres of glass about one-half inch in diameter, and is heated in a convenient way (not shown), such as by an electric heating device, to a temperature at which the glass is maintained in a freely fluid state. The molten glass in this condition readily flows through the openings in the nozzles of the bushing. As the molten glass flows from the nozzles it is drawn manually into filaments which are wound around a rapidly revolving spool or reel 29 which is driven in a conventional way (not shown). As the reel revolves, it continues to draw a filament from each of the nozzles and to attenuate the filaments to extreme fineness, the filaments normally being attenuated to a diameter of about 0.0003 inch. The fineness of the glass filaments is dependent largely upon the speed at which the filaments are drawn, finer diameter filaments being obtained when higher drawing speeds are employed than when lower drawing speeds are used.

The coating device of the apparatus shown in Fig. 4 comprises a graphite tube 30 having a longitudinal slit opening or passage 31 of capillary width, for instance a width of about 0.02 inch, extending between the inner and outer surfaces of the tube. The tube 30 is connected with a graphite receptacle 32 by pressing or cementing the tube into an opening in the wall of the receptacle in such a manner that the hollow interior of tube 30 communicates with the chamber 33 into which the coating metal is charged. The end of the tube 30 is closed with a graphite plug 34, as shown in Fig. 4.

The graphite receptacle 32 is heated in a convenient manner, such as by an electric heater 35 or by direct flame heating, to a temperature above the melting temperature of the metal coating material so that the metal will be maintained molten during the coating operation.

Coating metal is charged into chamber 33, normally in the form of small pieces of the metal, until the metal when in a molten state reaches a level just above that of the outer face of the slit opening 31. It may be necessary to induce the metal to rise in the capillary space of the slit opening 31 by gently tapping the device, the slight mechanical shock being sufficient to overcome the surface tension force which otherwise would normally prevent the metal from entering the slit opening. However, the surface tension does prevent the metal from flowing out of the slit opening, and causes the molten metal to be presented as a minute ridge or bead of liquid barely protruding along the outer edge of the slit opening 31.

The coating device is bodily moved to a position in which the glass filaments 28, 28 are drawn transversely across the mouth of slit opening 31 through the ridge or bead of molten metal. It is preferable that the filaments are not permitted to contact the graphite tube 30 during their advance so that no damage to the tube is occasioned by the filaments and so that optimum coatings on the filaments are obtained. If the filaments tend to bunch, they can be induced to distribute themselves in a spaced-apart position by slight adjustment of the relative positions of the bushing 26, the coating slit opening 31 and the reel 29, so that they will pass individually through the molten metal and be separately coated.

Since surface tension forces are sufficient to overcome gravitational forces acting on the metal at the mouth of the slit opening 31 under operating conditions, it makes no difference whether the slit opening faces up, down or sideways, and a sideways facing is sometimes preferred, since it is convenient to draw the glass filaments downward past the coating device.

In the operation of the device just described, it is found that a yarn can be produced, composed of a number of identical glass filaments of about 0.0003 inch diameter individually coated with a thin tightly adherent coating of zinc, by drawing the glass filaments at a speed of about 5,000 feet per minute through the molten zinc, which is at a temperature of about 450° C., at the mouth of the slit opening 31 of the coating device, after which the bundle of coated glass filaments is twisted to produce a yarn. Yarns so made are extremely strong and resistant to flexing and other mechanical action, as compared to yarns of uncoated glass filaments which fail almost immediately when subjected to flexing or other mechanical working.

While use of zinc metal has been mentioned in describing the examples above, similar results are obtained with other metals, such as lead, tin, aluminum and various alloys, when suitable changes in temperature of operation are made. When metals having relatively high melting points are used, high melting temperature glass filaments should be employed so that the filaments will remain substantially solid during the coating operation.

It is convenient to place a coating device immediately adjacent to a glass filament forming bushing, so that the drawing and coating can be part of a single operation. When this arrangement is used, the filaments are coated with metal before any deterioration of the filaments can occur, such as deterioration in strength of the filaments due to absorption of moisture from the atmosphere. Since the coated filaments will be substantially at room temperature after a few inches of advance past the coating device, even when the filaments are traveling at very high rates of speed, the reel or bobbin or other device for receiving the coated filaments may be positioned substantially immediately adjacent the coating device.

The coating operation described herein is continuous as long as sufficient molten metal is maintained in the various coating devices. The filaments can be coated with metal at rates varying over a wide range, coating rates from a few feet per minute to over 9,000 feet per minute having been successfully employed.

It is clear that many modifications and variations of this invention may be made without departing from the spirit and scope of the appended claims.

We claim:

1. A method for coating a glass filament in air with a coating of metal which comprises supplying molten metal to a passage of capilliary dimensions whereby only a small quantity of said molten coating metal is exposed to air at the orifice of said passage, supplying heat to the molten coating metal confined in said passage to maintain the coating metal molten, and advancing said glass filament through the molten metal at the said orifice.

2. The method of coating a glass filament with metal comprising suspending a globule of molten metal in a given position under its own surface tension, passing a continuous filament through said globule at a temperature compatible to receive a coating of said metal, and supplying molten metal for said globule to maintain it in size equilibrium by replenishing molten metal removed from said globule in coating said filament.

3. The method of coating glass filaments with metal comprising supplying molten metal to an orifice at a temperature such that a quantity of the metal is suspended therefrom and is prevented from freely flowing due to its own surface tension, guiding a continuous glass filament through said suspended metal at a temperature compatible to cause said filament to receive a coating thereof, and replenishing the molten metal removed from said suspended quantity of metal to maintain it in equilibrium for continuous coating of filaments drawn therethrough.

4. The method of producing a metal-coated glass fiber which comprises flowing a stream of glass from a source of molten glass, attenuating a continuous glass fiber from said stream, suspending a globule of molten metal in the path of said fiber by its own surface tension, moving said fiber through said suspended globule for a coating thereof, and replenishing the molten metal removed from said globule to maintain it in size equilibrium for continuous coating of said fiber.

References Cited in the file of this patent
UNITED STATES PATENTS

| | | |
|---|---|---|
| 1,454,224 | Schmidt | May 8, 1923 |
| 1,934,796 | Friederich | Nov. 14, 1933 |
| 2,053,923 | Stewart | Sept. 8, 1936 |
| 2,162,980 | Smith | June 20, 1939 |
| 2,234,986 | Slayer et al. | Mar. 18, 1941 |
| 2,325,129 | Hardy | July 27, 1943 |
| 2,373,078 | Kleist | Apr. 3, 1945 |
| 2,392,805 | Biefeld | Jan. 15, 1946 |
| 2,598,908 | Grimson | June 3, 1952 |
| 2,616,165 | Brennan | Nov. 4, 1952 |
| 2,693,429 | Radtke et al. | Nov. 2, 1954 |
| 2,772,518 | Whitehurst et al. | Dec. 4, 1956 |

FOREIGN PATENTS

| | | |
|---|---|---|
| 840,209 | France | Jan. 11, 1939 |